(12) United States Patent
Carlson et al.

(10) Patent No.: US 7,592,800 B2
(45) Date of Patent: Sep. 22, 2009

(54) ALIGNMENT SPACER FOR MAGNETIC ENCODER APPARATUS WITH AT LEAST ONE TAB

(75) Inventors: Rick Carlson, Plainfield, IL (US); Rick Moeller, Naperville, IL (US)

(73) Assignee: Measurement Specialties, Inc.

( * ) Notice: Subject to any disclaimer, the term of this patent is extended or adjusted under 35 U.S.C. 154(b) by 0 days.

(21) Appl. No.: 11/904,100

(22) Filed: Sep. 26, 2007

(65) Prior Publication Data

US 2008/0020851 A1 Jan. 24, 2008

Related U.S. Application Data

(62) Division of application No. 10/413,640, filed on Apr. 15, 2003, now Pat. No. 7,317,313.

(60) Provisional application No. 60/426,296, filed on Nov. 14, 2002.

(51) Int. Cl.
*G01N 7/30* (2006.01)
(52) U.S. Cl. .................................. 324/207.25
(58) Field of Classification Search .. 324/207.2–207.25
See application file for complete search history.

(56) References Cited

U.S. PATENT DOCUMENTS

| | | | |
|---|---|---|---|
| 4,612,501 A | 9/1986 | Costello et al. | |
| 4,983,916 A | 1/1991 | Ikjima et al. | |
| 5,045,920 A | 9/1991 | Vig et al. | |
| 5,089,817 A | 2/1992 | Santos et al. | |
| 5,172,057 A | 12/1992 | Yoshimura et al. | |
| 5,258,735 A | 11/1993 | Allwine, Jr. | |
| 5,313,159 A | 5/1994 | Allwine, Jr. | |
| 5,321,355 A | 6/1994 | Leutzow | |
| 5,391,595 A | 2/1995 | Clark, Jr. et al. | |
| 5,414,355 A | 5/1995 | Davidson et al. | |
| 5,422,568 A | 6/1995 | Hashizume et al. | |
| 5,506,579 A | 4/1996 | Spaulding | |
| 5,526,706 A | 6/1996 | Nelle | |
| 5,581,179 A | 12/1996 | Engel et al. | |
| 5,621,316 A | 4/1997 | Dames et al. | |
| 5,757,180 A | 5/1998 | Chou et al. | |
| 5,811,968 A | 9/1998 | Nakazawa et al. | |
| 5,945,753 A | 8/1999 | Maegawa et al. | |
| 5,982,169 A | 11/1999 | Furlani et al. | |
| 5,998,989 A | 12/1999 | Lohberg | |
| 6,118,271 A | 9/2000 | Ely et al. | |
| 6,124,710 A | 9/2000 | Kordecki | |

(Continued)

OTHER PUBLICATIONS

ED-11 Series Magnetic Encoder, encoder devices, obtained from http://www.disensors.com/HTML/pdf/ED-11.pdf, unknown date, 2 pages.

(Continued)

*Primary Examiner*—Jay M Patidar
(74) *Attorney, Agent, or Firm*—Howard IP Law Group, PC

(57) ABSTRACT

An alignment spacer having a diameter for use in a magnetic encoder apparatus for controlling the alignment of a magnet to a sensor ship having a major surface defining a reference plane includes a surface having at least one tab extending outwardly from the periphery of the surface. A raised portion extends from the surface defining an opening for receiving the sensor chip.

13 Claims, 5 Drawing Sheets

U.S. PATENT DOCUMENTS

| | | | |
|---|---|---|---|
| 6,137,288 | A | 10/2000 | Luetzow |
| 6,175,296 | B1 | 1/2001 | Tokunaga et al. |
| 6,178,318 | B1 | 1/2001 | Holmberg et al. |
| 6,232,772 | B1 | 5/2001 | Liatard et al. |
| 6,246,233 | B1 | 6/2001 | Griffen et al. |
| 6,288,533 | B1 | 9/2001 | Haeberli et al. |
| 6,294,910 | B1 | 9/2001 | Travostino et al. |
| 6,297,628 | B1 | 10/2001 | Bicking et al. |
| 6,300,758 | B1 | 10/2001 | Griffen et al. |
| 6,304,079 | B1 | 10/2001 | Kenjo et al. |
| 6,305,234 | B1 | 10/2001 | Thies et al. |
| 6,310,473 | B1 | 10/2001 | Zhao |
| 6,313,624 | B1 | 11/2001 | Alhorn et al. |
| 6,320,373 | B1 | 11/2001 | Strasser |
| 6,326,781 | B1 | 12/2001 | Kunde et al. |
| 6,326,782 | B1 | 12/2001 | Schroeder |
| 6,384,405 | B1 | 5/2002 | Kenjo et al. |
| 6,384,752 | B1 | 5/2002 | Suzuki et al. |
| 6,393,912 | B2 | 5/2002 | Pchelnikov et al. |
| 6,396,259 | B1 * | 5/2002 | Washeleski et al. .... 324/207.22 |
| 6,411,082 | B2 | 6/2002 | Glasson |
| 6,418,274 | B2 | 7/2002 | Tanaka |
| 6,431,877 | B1 | 8/2002 | Lemke et al. |
| 6,433,447 | B1 | 8/2002 | Kitazawa et al. |
| 6,448,768 | B1 | 9/2002 | Ishibashi et al. |
| 6,452,382 | B1 | 9/2002 | Tokunaga et al. |
| 6,455,957 | B1 | 9/2002 | Chitayat |
| 6,462,677 | B1 | 10/2002 | Johnson et al. |
| 6,472,863 | B1 | 10/2002 | Garcia |
| 7,053,602 | B2 * | 5/2006 | Jin et al. ................. 324/207.16 |
| 7,078,893 | B2 * | 7/2006 | Nakano et al. ......... 324/207.25 |
| 2001/0022212 | A1 | 9/2001 | Kapteyn et al. |
| 2002/0040801 | A1 | 4/2002 | Gutierrez |
| 2003/0038625 | A1 | 2/2003 | Guderzo |
| 2003/0085697 | A1 | 5/2003 | Dobbs et al. |

OTHER PUBLICATIONS

ED-12 Series Magnetic Encoder, encoder devices, obtained from http://www.disensors.com/HTML/pdf/ED-12.pdf, unknown date, 2 pages.

ED-13 Series Magnetic Encoder, encoder devices, obtained from http://www.disensors.com/HTML/pdf/ED-13.pdf, unknown date, 2 pages.

* cited by examiner

ALIGNMENT SPACER FOR MAGNETIC ENCODER APPARATUS WITH AT LEAST ONE TAB

RELATED APPLICATIONS

This application is a divisional of U.S. patent application Ser. No. 10/413,640, entitled MAGNETIC ENCODER APPARATUS, filed Apr. 15, 2003 now U.S. Pat. No. 7,317,313, which also claims priority to the provisional U.S. application Ser. No. 60/426,296, which was filed on Nov. 14, 2002, the disclosure and content of both of which are hereby incorporated by reference in their entireties.

FIELD OF THE INVENTION

The present invention relates to magnetic encoder technology and an apparatus that translates mechanical rotary motion into electronic information for use in various applications, such as motors or gasoline pumps.

BACKGROUND OF THE INVENTION

Magnetic encoders are used in applications such as flow control, medical, aerospace, transportation, military, heavy equipment and computers. These magnetic encoders essentially convert mechanical rotary motion into electrical signals such as digital pulse streams.

The technology of magnetic encoders consists of a diametrically polarized magnet, imbedded into the end of a rotating shaft, positioned over a custom Application Specific Integrated Circuit (ASIC) sensor. When the magnet is rotated, the alternating polarities cause the multiple hall effect sensors on the integrated circuit sensor chip to output two sine waves ninety degrees out of phase with each other. This information is fed into a decoding and interpolation portion of the integrated circuit sensor chip with the resulting encoder output being either an incremental 2 bit gray code, or SSI serial output.

Prior art magnetic encoder devices have limited accuracy because of the placement and alignment of the diametrically polarized magnet to the sensor chip. Misalignment of the diametrically polarized magnet to the sensor chip may cause inaccuracies in the device of up to four hundred percent. Currently, there is a need in the art for a device to ensure the accurate alignment of the sensor chip to the diametrically polarized magnet. In addition, there is a need in the art for a magnetic encoder apparatus that contains the alignment device in a single housing.

SUMMARY OF THE INVENTION

The apparatus of the present invention satisfies one or more of the above-mentioned deficiencies in the art. A magnetic encoder apparatus comprising a housing is disclosed in one aspect of the present invention. The housing includes a base portion and a cover plate portion. The housing also comprises a magnet that is contained in the base portion of the housing, a sensor chip having a major surface located adjacent to the magnet, and an alignment spacer comprising a first side and a second side. The first side of the alignment spacer has an opening through to the second side of the alignment spacer, and the second side fits into the base portion of the housing. The opening of the alignment spacer encloses the sensor chip.

In an embodiment of the invention, the alignment spacer has a diameter for use in a magnetic encoder apparatus for controlling the alignment of a magnet to a sensor chip having a major surface. The alignment spacer comprising a surface having at least one tab extending outwardly from the periphery of the surface, and a raised portion extending from the surface defining an opening for receiving the sensor chip.

These and other advantages and features of the invention will become apparent upon reading and following the detailed description and referring to the accompanying drawings which like numbers refer to like parts throughout.

DETAILED DESCRIPTION OF THE PREFERRED EMBODIMENTS

Figure 1:
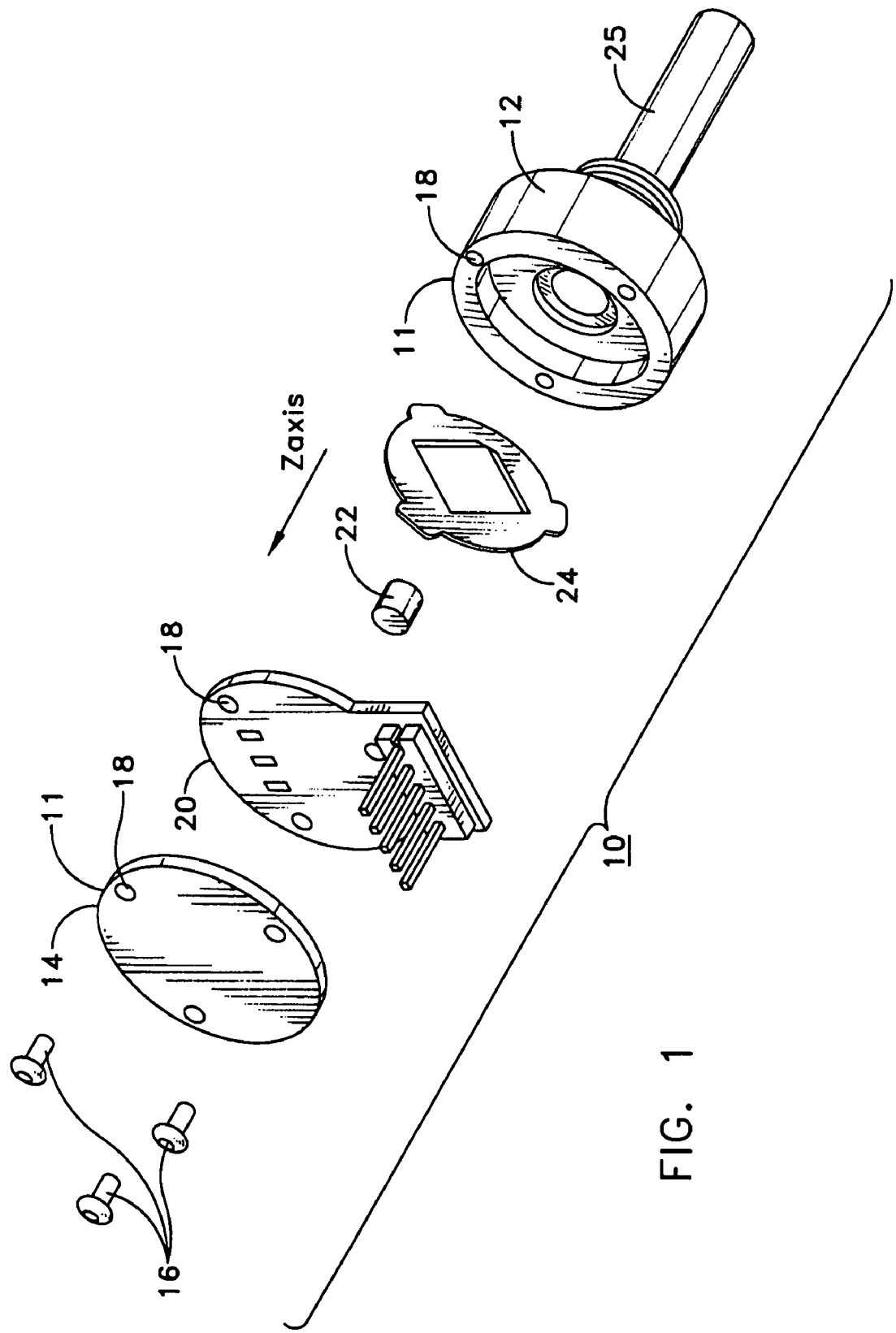
FIG. 1 is a diagrammatic illustration of the magnetic encoder apparatus in accordance with one embodiment of the present invention.

As illustrated in FIG. 1, a magnetic encoder apparatus 10 comprises a housing 11 having a base portion 12 and cover plate portion 14. The cover plate portion 14 is attached to the base portion 12 using screws 16.

The magnetic encoder housing 11 may contain various components such as a printed circuit board 20 including a sensor chip 23 (FIG. 2), a diametrically polarized magnet 22, and an alignment spacer 24. The base portion 12 of the magnetic encoder enclosure housing 11 is attached to a shaft assembly 25 that provides the rotational energy that will be converted into electrical signals. For example, in one embodiment the shaft assembly 25 is a motor shaft assembly that is attached to the magnetic encoder housing 11. The magnetic encoder apparatus 10 may sense the speed, direction, and/or the angular position of the motor shaft.

Screws 16 attaching the cover plate portion 14 to the base portion 12 may be of various sizes depending on the physical dimensions of the encoder enclosure. Screws 16 may be under sized as compared to the holes 18 that are located on the cover plate 14, printed circuit board 20, and base portion 12. The under sizing of the screws 16 enables the printed circuit board 20 to float within the magnetic encoder housing 11. One skilled in the art will realize that other ways of securing cover plate 14 to base portion 12 can be utilized to attach cover plate portion 14 to base portion 12 while still allowing printed circuit board 20 to float within the magnetic encoder housing 11.

Diametrically polarized magnet 22 is embedded in shaft assembly 25 so as to allow the diametrically polarized magnet 22 to rotate along with the shaft assembly 25. The rotation of shaft assembly 25 and the embedded diametrically polarized magnet 22 provides alternating polarities of the diametrically polarized magnet 22. The alternating polarities of the diametrically polarized magnet 22 may cause multiple hall effect sensors on the sensor chip 23 to output two sine waves ninety degrees out of phase with each other.

Figure 2:
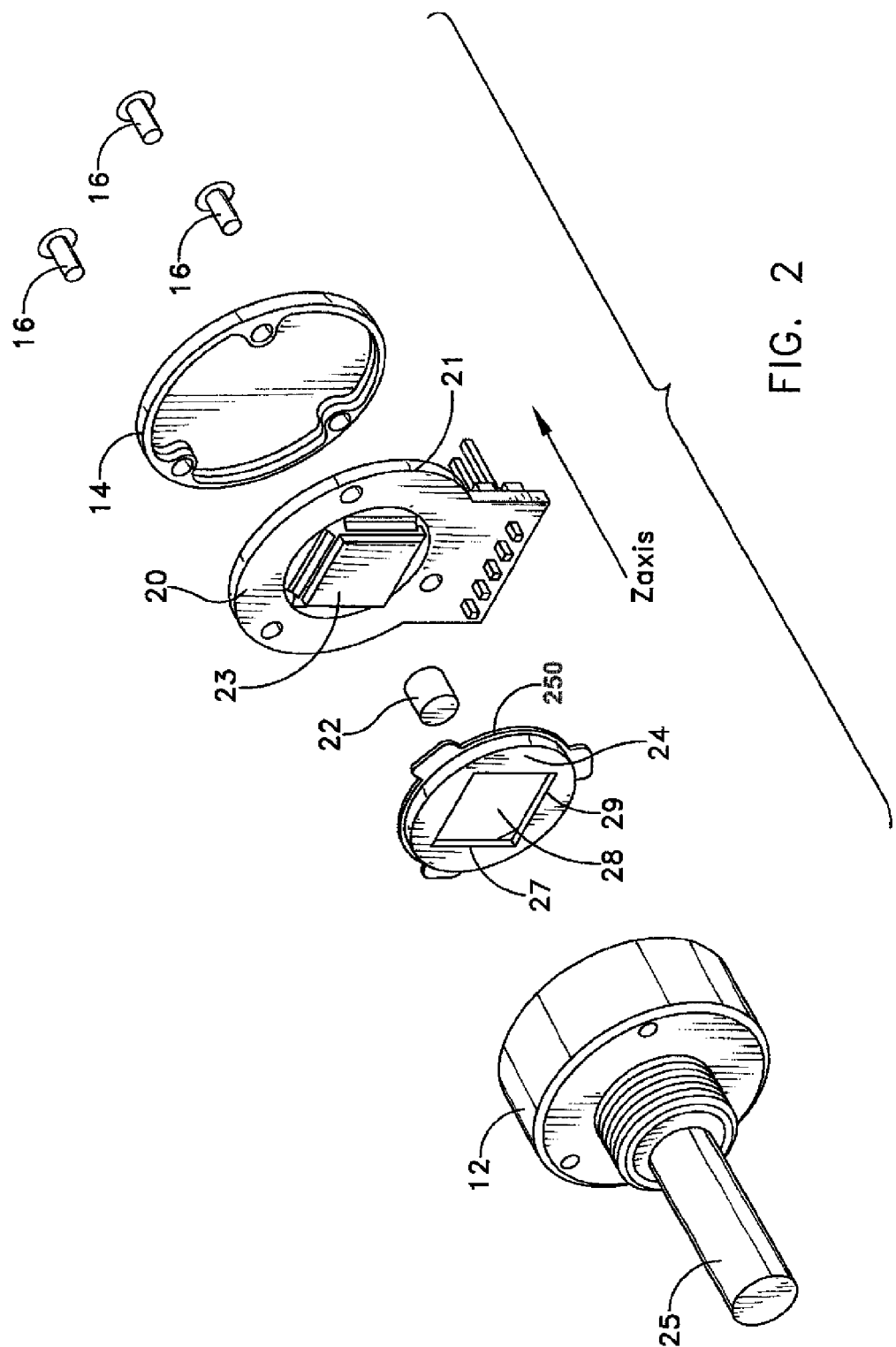
FIG. 2 is a diagrammatic illustration of another view of the encoder apparatus in accordance with one embodiment of the present invention.

Referring to FIG. 2, alignment spacer 24 comprises a first side 250 and a second side 27. The alignment spacer may be manufactured from a non-conductive material such as liquid crystal polymer or thermoplastic. The alignment spacer 24 has a raised portion 29 that defines an opening 28 that extends from the first side 250 to the second side 27. Opening 28 may enclose a sensor chip 23 that is located on printed circuit board 20. The sensor chip 23 may comprise an angular magnetic encoder integrated circuit similar to the ones manufactured by austriamicrosystems AG of Japan or RLS merlina technika d.o.o. of Ljubijana, Slovenija.

The opening 28 may pilot tightly over sensor chip 23. The opening 28 and the diameter of the alignment spacer 24 controls movement of the sensor chip 23 in a direction parallel to a reference plane. The reference plane may be defined by a major surface of the sensor chip 23.

In one embodiment, a major surface of the sensor chip 23 may be defined as a top surface 21 of sensor chip 23. One skilled in the art will realize that a different-sensor chip surface may be defined as a major surface that may also define a reference plane. For purposes of illustration, the top surface 21 of sensor chip 23 is defined as a major surface defining a reference plane. Movement parallel to the top surface 21 or reference plane indicates movement in the X and Y direction. For example, sensor chip 23, which is included on printed circuit board 20, may move relative to diametrically polarized magnet 22. In order to provide accurate alignment of the diametrically polarized magnet 22 to the sensor chip 23, the center of the diametrically polarized magnet 22 (the rotation axis) is aligned with the center of the top surface 21 of sensor chip 23.

Accurate alignment of sensor chip 23 to diametrically polarized magnet 22 provides for increased accuracy of the magnetic encoder apparatus. Alignment spacer 24 allows the magnet to sensor alignment to be maintained to such a degree that the linearity or accuracy of the device cannot be adversely affected by assembly methods or techniques.

Movement in the X or Y-axis of the sensor chip 23 away from the center of the diametrically polarized magnet 22 (the rotation axis) can reduce the accuracy of the magnetic encoder apparatus 10. Alignment spacer 24 allows for the accurate alignment of the sensor chip 23 to the diametrically polarized magnet 22 by controlling the alignment of sensor chip 23, which is mounted to printed circuit board 20.

In addition, the reference plane also defines movement in the Z-axis, the direction of movement of sensor chip 23 towards or away from the diametrically polarized magnet 22. FIG. 2 shows the Z-axis perpendicular to the top surface 21 or reference plane. Movement perpendicular to the top surface 21 or reference plane indicates movement in the Z-axis. For example, sensor chip 23, which is mounted on the printed circuit board 20, may move relative to diametrically polarized magnet 22. In order to provide accurate alignment of the diametrically polarized magnet 22 to the sensor chip 23, the center of the diametrically polarized magnet 22 (the rotation axis) is aligned with the center of top surface 21 of the sensor chip 23. Movement of sensor chip 23 in the Z direction may reduce the accuracy of the magnetic encoder apparatus.

Figure 3:
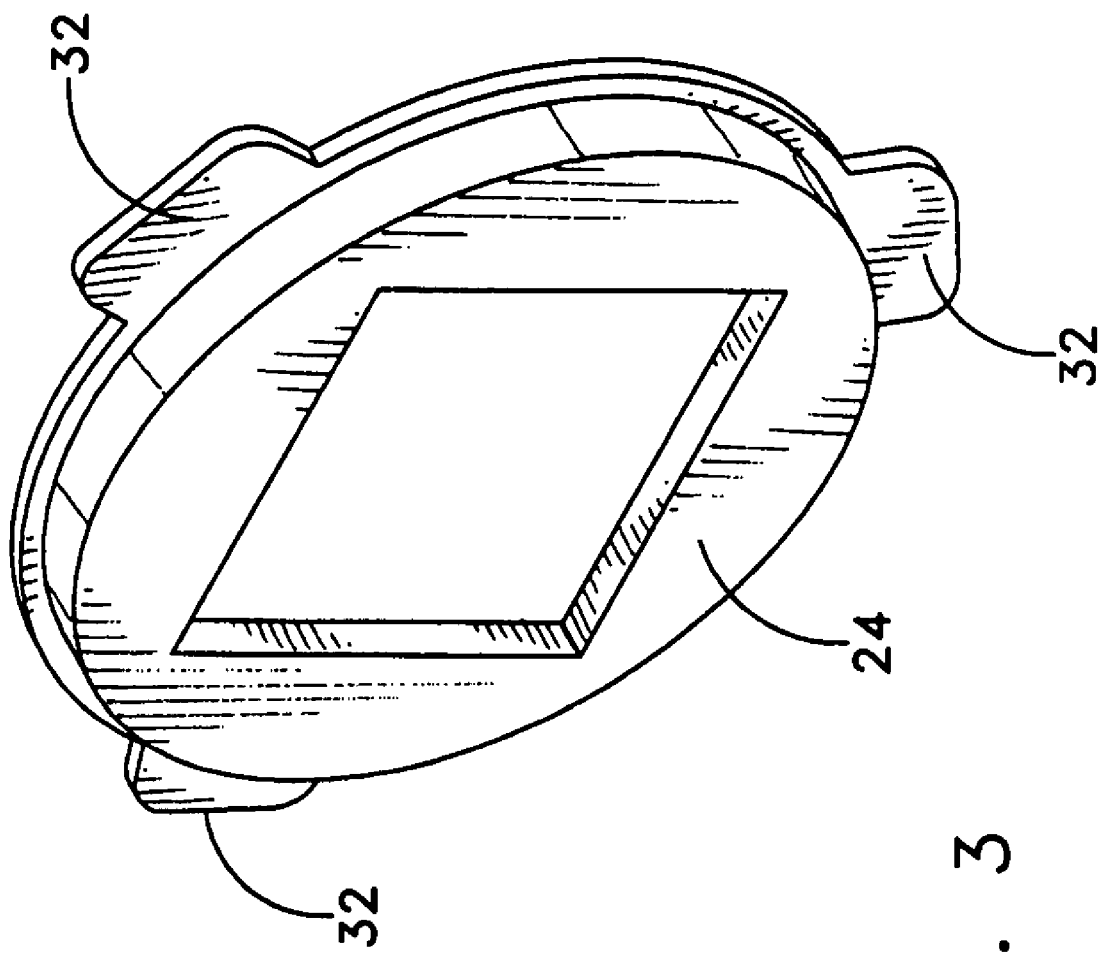
FIG. 3 is a diagrammatic illustration of an alignment spacer in accordance with one embodiment of the present invention.

Referring to FIG. 3, the alignment spacer 24 comprises a set of tabs 32 extending outwardly from the periphery of the alignment spacer 24. The tabs 32 control movement in the Z-axis in a direction perpendicular to top surface 21 or reference plane. FIG. 3 shows alignment spacer 24 with a set of three tabs 32. One skilled in the art will realize that alignment spacer 24 may have more or less than three tabs 32 extending outwardly. The tabs 32 may fit into a tightly held bore of housing 12. The mating tolerances may be +/−0.001 (line on line to 0.002 clearance fit).

Figure 4:
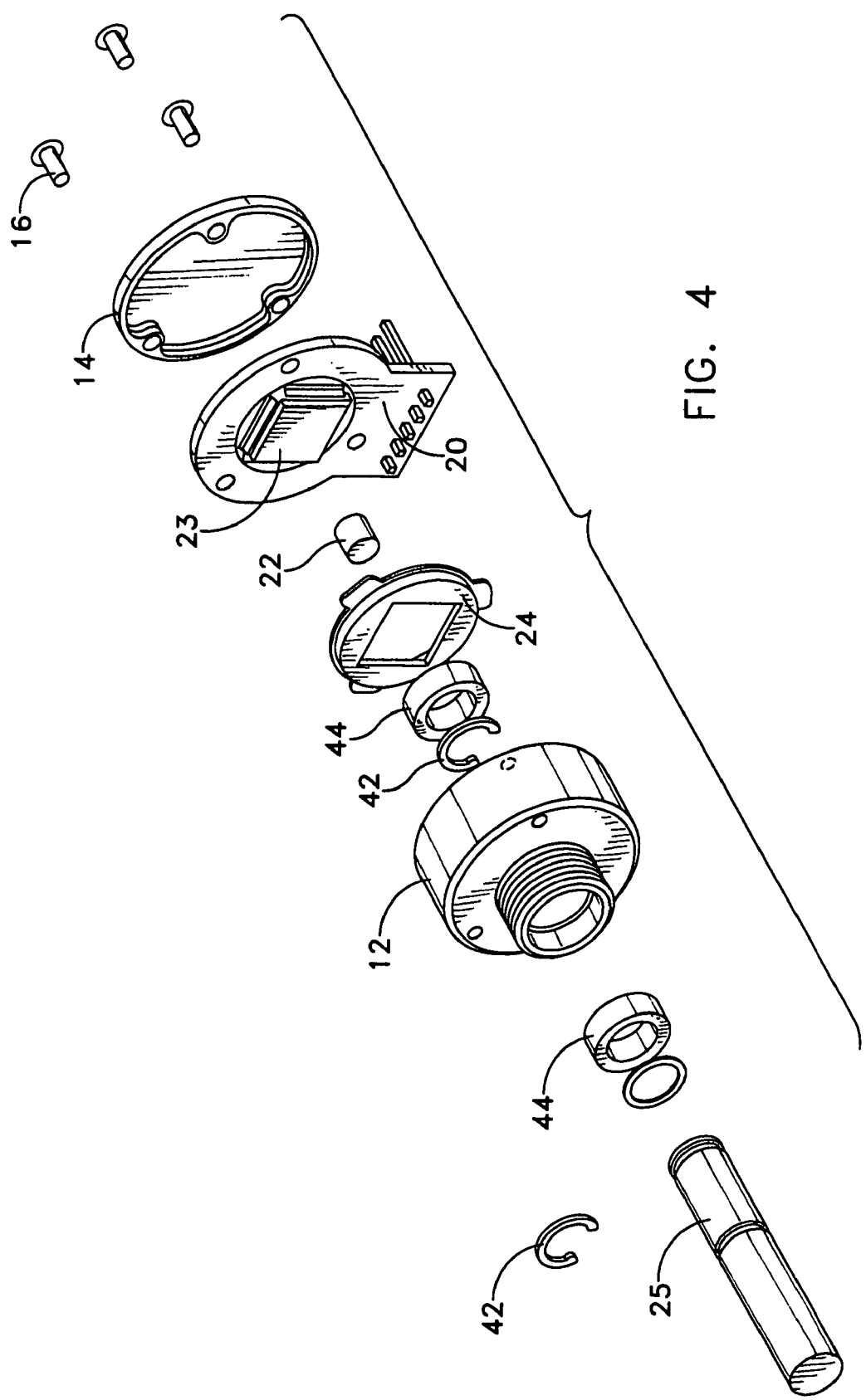
FIG. 4 is a detailed diagrammatic illustration of the magnetic encoder apparatus in accordance with one embodiment of the present invention.

FIG. 4 is a detailed illustration of the components of an embodiment of the present invention. Shaft assembly 25 is connected to the housing 12 and held in position by shaft retaining clips 42. The shaft assembly also comprises ball bearings 44 that enable the shaft assembly 25 to rotate and provide rotational energy to the encoder apparatus 10.

Figure 5:
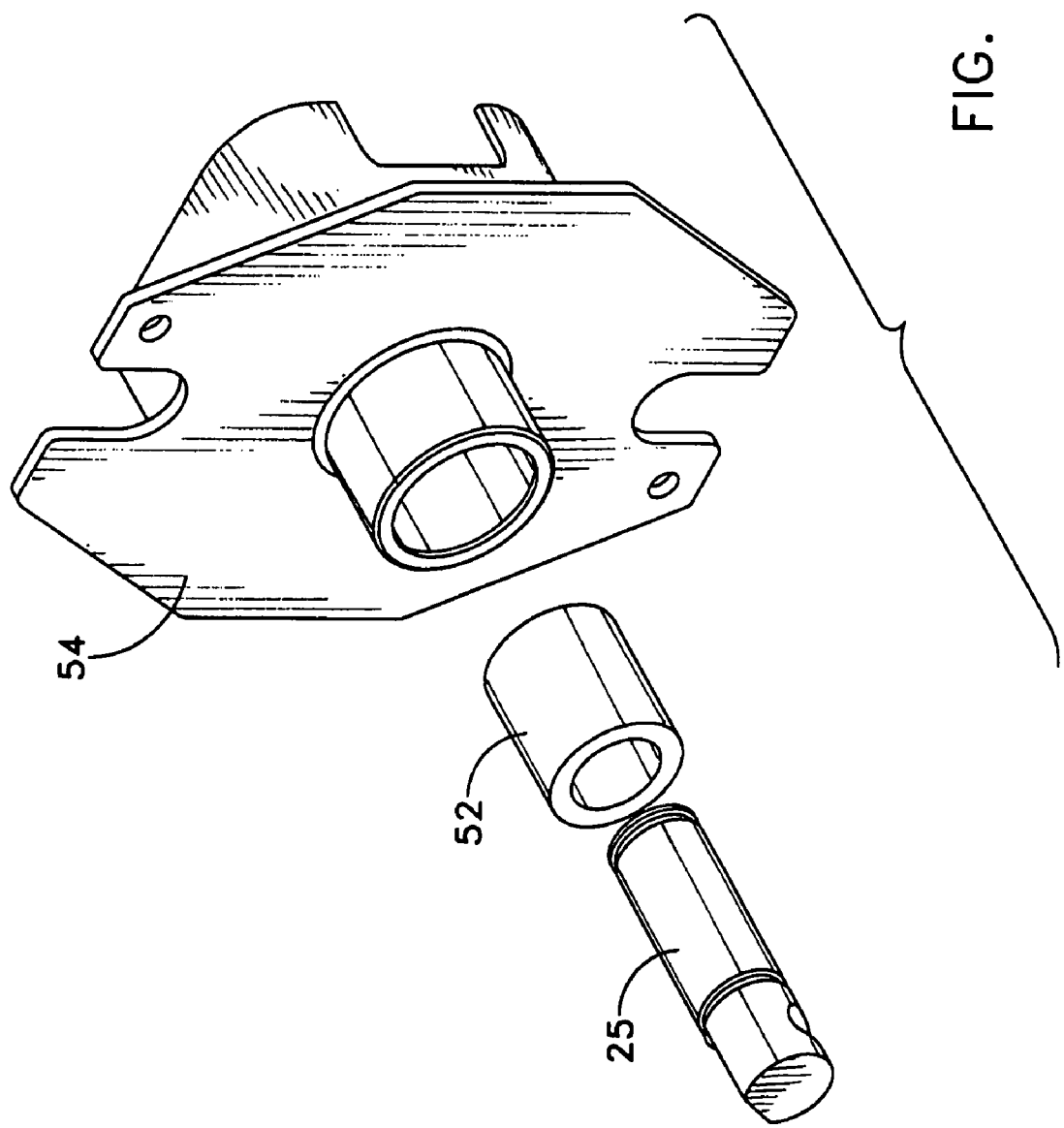
FIG. 5 is a diagrammatic illustration of a composite bearing for use in the magnetic encoder apparatus in accordance with one embodiment of the current invention.

FIG. 5 illustrates an alternative embodiment of the present invention in which the ball bearing may comprise a composite bearing 52. The composite bearing may be made of a material such as "Rulon J" which is made from specially formulated PTFE compounds and machined to close tolerances.

In addition, the housing may be a precision machined housing 54 manufactured from a precision screw machine instead of a cast housing. The precision machined housing 54 may be made on a precision screw machine that allows overall tolerances to be held within 0.001. The additional accuracy may improve the performance of the encoder device by maintaining the mechanical relationships to a higher degree.

The embodiments of the invention, and the invention itself, are now described in such full, clear, concise and exact terms to enable a person of ordinary skill in the art to make and use the invention. To particularly point out and distinctly claim the subject matters regarded as invention, the following claims conclude this specification. To the extent variations from the preferred embodiments fall within the limits of the claims, they are considered to be part of the invention, and claimed.

We claim:

1. An alignment spacer having a diameter for use in a magnetic encoder apparatus for controlling the alignment of a magnet to a sensor chip, wherein the sensor chip is located on a printed circuit board, and wherein the sensor chip has a major surface defining a reference plane, the alignment spacer comprising:
   a surface having at least one planar tab extending outwardly from the periphery of the surface; and
   a raised portion extending from the surface defining an opening for receiving the sensor chip wherein said spacer is non-conductive and non magnetizable.

2. The alignment spacer of claim 1, wherein the alignment spacer is comprised of liquid crystal polymer.

3. The alignment spacer of claim 1, wherein the alignment spacer is comprised of a thermoplastic.

4. The alignment spacer of claim 1, wherein the surface comprises three tabs extending outwardly for the periphery of the surface.

5. The alignment spacer of claim 1, wherein the opening for receiving the sensor chip and the alignment spacer diameter control alignment of the sensor chip in a direction parallel to the reference plane.

6. The alignment spacer of claim 1, wherein the at least one tab extending outwardly from the periphery of the surface of the alignment spacer controls alignment of the sensor chip in a direction perpendicular to the reference plane.

7. An alignment spacer for use in a magnetic encoder apparatus having a housing having an interior circumference, for controlling the alignment of a sensor chip having a major surface defining a reference plane and a major surface circumferential shape, comprising:
- a planar main section, having a circumference matching the interior circumference of the housing;
- an opening defined through said planar main section having a circumference
- matching and enclosing the major surface circumferential shape of the sensor chip; and
- at least one tab extending outward from the circumference of the main section.

8. The alignment spacer of claim 7, wherein the alignment spacer is comprised of liquid crystal polymer.

9. The alignment spacer of claim 7, wherein the alignment spacer is comprised of a thermoplastic.

10. The alignment spacer of claim 7, comprising at least three tabs extending outward from the circumference of the main section.

11. The alignment spacer of claim 7, where the opening pilots tightly the sensor chip.

12. The alignment spacer of claim 7, wherein said at least one tab fits into a tightly held bore of said housing.

13. The alignment spacer of claim 7, comprising a plurality of equally spaced tabs extending outward from the circumference of the main section.

* * * * *